United States Patent
Iyengar et al.

(10) Patent No.: US 10,469,613 B2
(45) Date of Patent: Nov. 5, 2019

(54) PROVIDING MULTIPLE USER PROFILES TO A SINGLE USER

(71) Applicant: Wyse Technology L.L.C., Santa Clara, CA (US)

(72) Inventors: Ravi Santhehalli Keshava Iyengar, Bangalore (IN); Prasant Kumar Das, Bangalore (IN)

(73) Assignee: Wyse Technology L.L.C., Santa Clara, CA (US)

(*) Notice: Subject to any disclaimer, the term of this patent is extended or adjusted under 35 U.S.C. 154(b) by 357 days.

(21) Appl. No.: 15/348,043

(22) Filed: Nov. 10, 2016

(65) Prior Publication Data

US 2018/0131784 A1    May 10, 2018

(51) Int. Cl.
*G06F 15/16* (2006.01)
*H04L 29/08* (2006.01)

(52) U.S. Cl.
CPC .......... *H04L 67/306* (2013.01); *H04L 67/141* (2013.01)

(58) Field of Classification Search
CPC .................................................... H04L 67/306
USPC .......................................................... 709/227
See application file for complete search history.

(56) References Cited

U.S. PATENT DOCUMENTS

| | | | |
|---|---|---|---|
| 8,166,455 B2* | 4/2012 | Voss | G06F 9/451 717/106 |
| 2009/0204925 A1* | 8/2009 | Bhat | G06F 1/1626 715/778 |
| 2011/0107409 A1* | 5/2011 | Wilkinson | G06F 21/335 726/8 |
| 2011/0251992 A1* | 10/2011 | Bethlehem | H04L 12/2863 707/610 |
| 2013/0007737 A1* | 1/2013 | Oh | G06F 9/452 718/1 |
| 2013/0073703 A1* | 3/2013 | Das | G06F 9/5072 709/223 |
| 2018/0046488 A1* | 2/2018 | Sakamoto | G06F 13/00 |
| 2018/0131784 A1* | 5/2018 | Iyengar | H04L 67/306 |

* cited by examiner

*Primary Examiner* — Anthony Mejia
(74) *Attorney, Agent, or Firm* — Kirton McConkie; Brian Tucker

(57) ABSTRACT

A single user can be provided multiple user profiles. When a user logs in to a computing device, the user can be given the option of selecting one of the multiple user profiles and/or the option to create a new user profile. The user can therefore select a user profile that is most appropriate for a particular situation. By employing a layering system, these multiple user profiles can be provided in various types of virtualization environments and independently of the operating system version.

20 Claims, 17 Drawing Sheets

PROVIDING MULTIPLE USER PROFILES TO A SINGLE USER

CROSS-REFERENCE TO RELATED APPLICATIONS

N/A

BACKGROUND

The present invention is generally directed to enabling a single user to have multiple user profiles in a layering system. A layering system is a tool that enables an operating system, user applications, and user data to be layered on the user's computing device. When using a layering system, layered applications and data may be executed natively on the user's computing device without the use of a virtual machine or other sandboxed execution environment. This native execution will therefore cause the layered applications to appear, both to the user and to other applications, as if they were being executed in a "normal" manner. This is in contrast to many types of virtualization techniques such as terminal services and application virtualization where it is typically clear that the applications are executed in a separate environment. It is also possible to implement layering in a virtual environment by implementing the layering on a virtual machine.

U.S. patent application Ser. Nos. 14/719,248 and 14/719,256 are both directed to a layering system and provide a background for the present invention. The content of these applications is therefore incorporated by reference. It is noted that both of these applications are commonly owned and would not constitute prior art to the present invention. Therefore, this background should not be construed as admitting prior art, but should be construed as describing various features on which the present invention is based and that may even form part of the present invention.

As is described in the '248 and '256 applications, a layer is a collection of data or resources which enables the collection to be isolated or set apart from the data or resources in another layer. To summarize this layering, FIG. 1 provides simplified examples of a user data layer 101 and an application layer 102. It is noted that a layer containing an operating system may also exist. Each layer can be stored in a manner that allows the layer to be separately mounted for access. For example, each layer may comprise a separate partition of a disk (including of a virtual disk), a folder, a network share, etc. The ability to separately mount a layer allows the layering system to selectively provide access to particular layers. It will be assumed that the layering system determines that user data layer 101 and application layer 102 should be mounted in response to the user logging in to a computing device on which the layering system executes or which the layering system otherwise controls.

As shown in FIG. 1 and for simplicity, application layer 102 includes a single application, WINWORD.EXE, which is the executable for Microsoft Word. Word also requires a number of registry settings to execute properly, and therefore, application layer 102 also includes such registry settings. It is noted that these registry settings, which would normally be stored within the registry of the operating system, could be stored within application layer 102 in a registry hive. Of course, a typical installation of Word would require a number of other files and/or settings which are not depicted. Application layer 102 also includes layer metadata which describes the content of application layer 102 (e.g., which describes that the layer includes WINWORD.EXE and whatever structure is used to store the Word registry settings). This layer metadata is critical because it allows the layering system to quickly determine what exists on the layer.

User data layer 101 is structured in a similar way. However, as a user data layer, it stores the user's files which in this case constitute two Word documents: Report.docx and Summary.docx. As with application layer 102, user data layer 101 may also store a number of other files including configuration files that may be particular to this user (e.g., a template file for Word). User data layer 101 also includes layer metadata which defines the content of the layer. Again, this layer metadata is critical because it allows the layering system to quickly determine what exists on the layer.

As mentioned above, a layer can be a separately mountable portion of a storage device (whether physical or virtual) such as a partition, folder, network share, etc. Accordingly, when the user logs on to a computing device, the layering system can mount layers 101 and 102 so that the user will have access to MS Word and his documents which are included in these layers. However, if a different user were to log in to the same computing device, the layering system could instead mount an application layer and user data layer pertaining to the different user so that the different user can only access the applications and user data defined in those layers.

The process by which the user accesses the data and resources included on each layer is provided in the '248 and '256 applications and will not be described in detail in this specification. By way of an overview, the layering system includes a file system filter driver and a registry filter driver which can function to intercept and redirect file system and registry operations as appropriate. In particular, these filters can be registered with the OS so that they will receive all file system and registry operations respectively. If a file system or registry operation pertains to content of a layer rather than to content of the file system or registry directly provided by the OS, the filters can redirect the operation to the corresponding layer. The '248 and '256 applications provide a number of examples of this type of redirection.

The result of this redirection is that, from the user perspective, the files of the layers do not appear to be stored in a different manner than any other file would typically be stored by the OS. For example, if the user data layer 101 were assigned a volume of E:, the layering system could cause the files to appear as if they were stored in the typical C: volume. In other words, the fact that multiple volumes may be loaded is abstracted (and even hidden) from the user perspective. It is again reiterated that the use of layer metadata to define what is stored on each layer allows this process to be carried out efficiently as is described in the '248 and '256 applications.

FIGS. 2A and 2B each illustrate an example of how the layering system can function. Each of these examples involve the layering file system filter driver (or LFFD) 201 and its role in determining whether to redirect a file open request. It is noted that a similar process would be carried out by the layering registry filter driver (or LRFD) if the operation pertained to the registry.

As shown in FIGS. 2A and 2B, it will be assumed that the operating system provides a file system 200 for handling I/O to the various mounted partitions. It will also be assumed that the operating system has mounted a C: volume and that the layering system has mounted an E: volume that corresponds to user data layer 101. In the following description, the E: volume and user data layer 101 (or simply layer) will be used interchangeably. Because of the layering system, even though the E: volume is a separate volume from the C: volume, the contents of the E: volume will appear as if they were stored on the C: volume. In other words, the layering system can make it appear as if a single volume were mounted.

Accordingly, if the user selects to open the Report.docx file that is stored on the E: volume, a file open request 210 of C:\Docs\Report.docx may be generated. As is described in the '248 and '256 applications, LFFD 201 is registered as a filter driver for file system 200 and therefore will receive the opportunity to evaluate file open request 210. LFFD 201 can evaluate the target of file open request 210 against the layer metadata of the E: volume (and possibly against layer metadata of any other mounted layer) to determine if the request pertains to the layer. In this case, it will be assumed that the layer metadata indicates that the E: volume includes the path \Docs and that the Report.docx file is stored in the path. As a result, LFFD 201 can modify file open request 210 to create modified file open request 210*a* of E:\Docs\Report.docx. Modified file open request 210*a* is then passed to file system 200 which will open Report.docx from the appropriate location on the E: volume. LFFD 201 can perform this type of rerouting for any I/O that pertains to content stored on the E: volume. The determination of whether I/O pertains to content on a particular layer is based on the layer metadata for that particular layer.

FIG. 2B illustrates the case where LFFD 201 determines that a file open request 220 does not pertain to a layer (or at least does not pertain to a layer separate from the layer that includes the operating system). In this example, file open request 220 is directed to File.txt which is stored in a Downloads folder that is assumed to exist on the C: volume. Upon receiving file open request 220, LFFD 201 will evaluate the request against the layer metadata for the E: volume and determine that the E: volume does not include a path of \Downloads. Accordingly, LFFD 201 can allow file open request 220 to pass to file system 200 without modification since the request already includes the correct path to File.txt.

To summarize, LFFD 201 selectively modifies I/O requests so that they are directed to the appropriate layer. In the case of registry access, the LRFD would perform similar functionality to ensure that the registry access is directed to the appropriate layer. It is again reiterated that this rerouting is necessary because the layering system causes the layers to be hidden from the user's perspective while still being visible to the underlying file system.

In typical systems that implement this type of layering, there may be multiple layers mounted that each provide applications to the user. FIG. 3 illustrates an example of this. As shown, a system may include an operating system partition 301 (which may or may not be a layer) on which the operating system 302 and registry hive 303 are stored. Registry hive 303 can include configuration settings of operating system 302 and possibly of any application on operating system partition 301 or any application that may be executed on the system. As an example, operating system partition 301 can represent a typical partition of a system's hard drive or may represent a vdisk. When operating system 302 executes, it will load registry hive 303 into the registry where the configuration settings can be accessed (e.g., via the configuration manager) by the operating system and other processes/threads.

FIG. 3 also illustrates two application layers 311, 321 that are assumed to have been mounted by layering file system filter driver (LFFD) 330 on the system. As an example, each of application layers 311, 321 could be a separate drive, a separate partition of a drive, a VHD, a network share, a mounted folder, etc. Application layer 311 includes applications 312*a* and 312*b* while application layer 321 includes applications 322*a* and 322*b*. Application layers 311 and 321 also include registry hives 313 and 323 respectively which store the configuration settings for the applications on the respective application layer. For example, registry hive 313 can store any registry keys and corresponding values employed by application 312*a* or application 312*b* while registry hive 323 can store any registry keys and corresponding values employed by application 322*a* or application 322*b*. Although not shown, each application layer 311, 321 can include layer metadata (of which registry hives 313, 323 form a part).

As described in the '248 and the '256 applications, when a layer is mounted, LFFD 330 can load the layer's registry hive into the registry where it can be accessed using typical registry operations. Layering registry filter driver (LRFD) 340 can be registered with the configuration manager of operating system 302 to receive any calls to access the registry. When LRFD 340 receives a registry operation it can access the layer metadata of each layer to determine to which registry hive the registry operation should be directed. LRFD 340 can then modify the registry operation so that it includes the correct path.

FIGS. 3A-3C illustrate an example of how each of registry hives 303, 313, and 323 can be loaded into the registry. In FIG. 3A, the operating system's registry hive 303 is shown as being loaded. For simplicity, registry hive 303 is shown as including a subkey (\SOFTWARE\Microsoft\Windows\CurrentVersion) that has a single value (CommonFilesDir) with data of C:\Program Files\Common Files. When this subkey is loaded into registry 450, it will be positioned under the HKLM key as shown. Therefore, any request to access the CommonFilesDir value will specify a path of (or more particularly, will provide a handle to) HKLM\SOFTWARE\Microsoft\Windows\CurrentVersion.

FIG. 3B illustrates how registry hive 313 can be loaded into registry 450 when application layer 311 is mounted. Registry hive 313 is shown as including a subkey (\SOFTWARE\Vendor1\Key1) that has a single value (InstallDirectory) with data of C:\Program Files\Vendor1\Dir1. Although this subkey may have a similar path as the CommonFilesDir subkey (i.e., although this subkey falls under the SOFTWARE subkey), because it is part of a different registry hive, it will be loaded in a unique location. As shown, rather than storing the \SOFTWARE\Vendor1\Key1 subkey under the existing SOFTWARE subkey (which would typically be the case if the corresponding application had been installed on operating system partition 301), the subkey is stored under the subkey AppLayer 311. Accordingly, but for LRFD 340, any request to access the InstallDirectory value would need to specify a path of HKLM\AppLayer 311\SOFTWARE\Vendor1\Key1. However, as described in the '248 and the '256 applications, LRFD 340 can cause the contents of registry hive 313 to appear as if it were not separate from registry hive 303. In other words, LRFD 340 can cause the value to appear as if it is located at HKLM\SOFTWARE\Vendor1\Key1.

FIG. 3C illustrates how registry hive 323 can be loaded into registry 450 when application layer 321 is mounted. The same process can be performed as described above so that subkey \SOFTWARE\Vendor2\Key1 is stored under the AppLayer 321 subkey. Therefore, the EnableUsageStats value can be accessed at the path HKLM\AppLayer 321\SOFTWARE\Vendor2\Key1. However, due to the role of LRFD 340, this subkey will appear to applications and the operating system as if it was stored at HKLM\SOFTWARE \Vendor2 \Key1.

To implement this abstraction, LRFD 340 intercepts any registry operation to determine whether the operation is directed to a registry hive of one of the mounted layers rather than to the operating system's registry hive. For example, in response to receiving a request to obtain a value of a particular registry subkey, LRFD 340 may be configured to first access registry hive 313 to determine if it includes the key (e.g., by determining whether the subkey is stored under the AppLayer 311 subkey). If the subkey is found in registry hive 313, LRFD 340 may respond with its value. However, if the subkey is not found in registry hive 313, LRFD 340 may then access registry hive 323 to perform the same process. If LRFD 340 does not find the subkey in registry hive 323, it would then allow the operating system to fulfill the request in a normal fashion.

Accordingly, LRFD 340 is configured to iteratively access the application layer registry hives when handling a registry operation. If none of the application layer registry hives have the subkey that is the target of the registry operation, LRFD 340 will pass the registry operation on to operating system 302 for normal processing.

To summarize, in a layering system, any number of layers can be mounted to a computing system and the layering file system and registry filter drivers can cause the contents of these layers to appear as if they were stored on the same partition (e.g., as if they were all stored on the C: drive) or within the same registry hive (e.g., under the HKLM\Software key). When a user logs into a computing device that is configured to implement a layering system, a corresponding user profile will dictate which layers are mounted on the computing device. For example, in the case where the layers are provided by a server, the user profile can instruct the server of which layers (e.g., in the form of VHDs) to send to the computing device where they will be mounted or of which layers to stream to the computing device.

BRIEF SUMMARY

The present invention extends to methods, systems, and computer program products for enabling a single user to have multiple user profiles. When a user logs in to a computing device, the user can be given the option of selecting one of the multiple user profiles and/or the option to create a new user profile. The user can therefore select a user profile that is most appropriate for a particular situation. By employing a layering system, these multiple user profiles can be provided in various types of virtualization environments and independently of the operating system version.

Each user profile can be provided using a separate user data layer in a layering system. Therefore, when a user logs in, the user data layer for the selected user profile, which may be in the form of a VHD, can be mounted along with any application layers that the user profile indicates should be included. Due to the layering, the user data layer and any application layers can appear as if they were part of the same partition as the operating system. In this way, the user can select an appropriate user profile for a particular situation without the necessity of creating multiple desktops.

In one embodiment, the present invention is implemented by a server as a method for providing multiple user profiles to a user. The server can store a first user data layer for a user. The first user data layer stores data defining a first user profile of the user. In response to the user attempting to log in to a desktop from a client device, the server can present to the user an option to select the first user profile or to request creation of a new user profile. When the user selects the first user profile, the server mounts the first user data layer to customize the desktop in accordance with the first user profile, whereas, when the user requests creation of the new user profile, the server creates a new user data layer as a copy of the first user data layer and mounts the new user data layer to customize the desktop in accordance with the new user profile.

In another embodiment, the present invention is implemented by a server as a method for providing multiple user profiles to a user. The server can store a plurality of user data layers for a user. Each user data layer stores data defining a different user profile of the user. In response to the user attempting to log in to a desktop from a client device, the server can present to the user an option to select any of the different user profiles of the user. In response to the user selecting one of the different user profiles, the server can mount the corresponding user data layer to customize the desktop in accordance with the selected user profile.

In another embodiment, the present invention is implemented as a layering system that includes a server that stores one or more operating system layers that each include an operating system, a plurality of application layers that each include one or more applications, and a plurality of user data layers that each define a user profile for a particular user. The server also stores information defining to which user each user data layer pertains. When a particular user attempts to log in to a desktop provided by the server, the server identifies each user data layer that pertains to the particular user and presents to the particular user an option to select any of the user profiles defined by the identified user data layers. In response to the user selecting one of the user profiles, the server mounts the user data layer that defines the selected user profile such that the desktop is customized in accordance with the selected user profile.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Prior to describing the present invention, it is noted that the present invention can be implemented in various virtualization environments. For example, the present invention can be implemented in an OS (or vDisk) streaming environment. In such environments, the applicable layers will be mounted on the server and streamed to the user's client device in real time. Additionally, the present invention can be implemented in a virtual desktop infrastructure (VDI) environment. In such environments, the applicable layers will be mounted and executed on the server with the display output being remoted to the user's client device. In short, in any virtualization environment in which layering can be implemented, the present invention may also be implemented. For the sake of simplicity, it will be assumed in the following description that the layers are VHD files.

Figure 1:
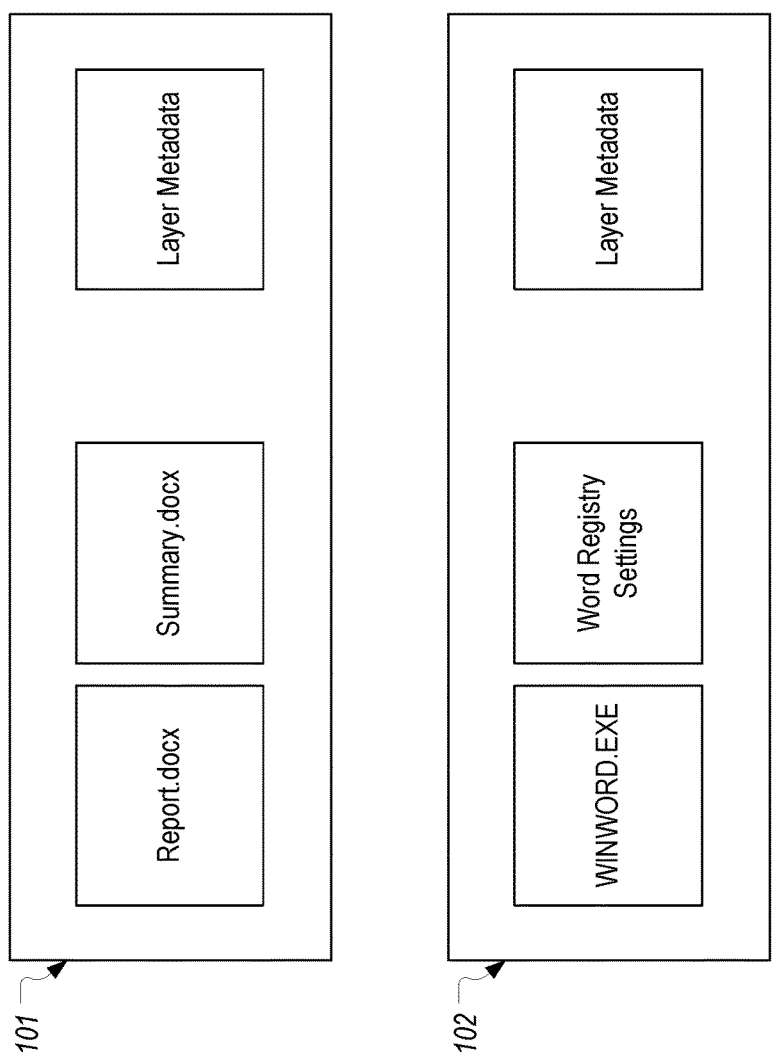
FIG. 1 illustrates simplified examples of layers of a layering system.
Figure 2A:
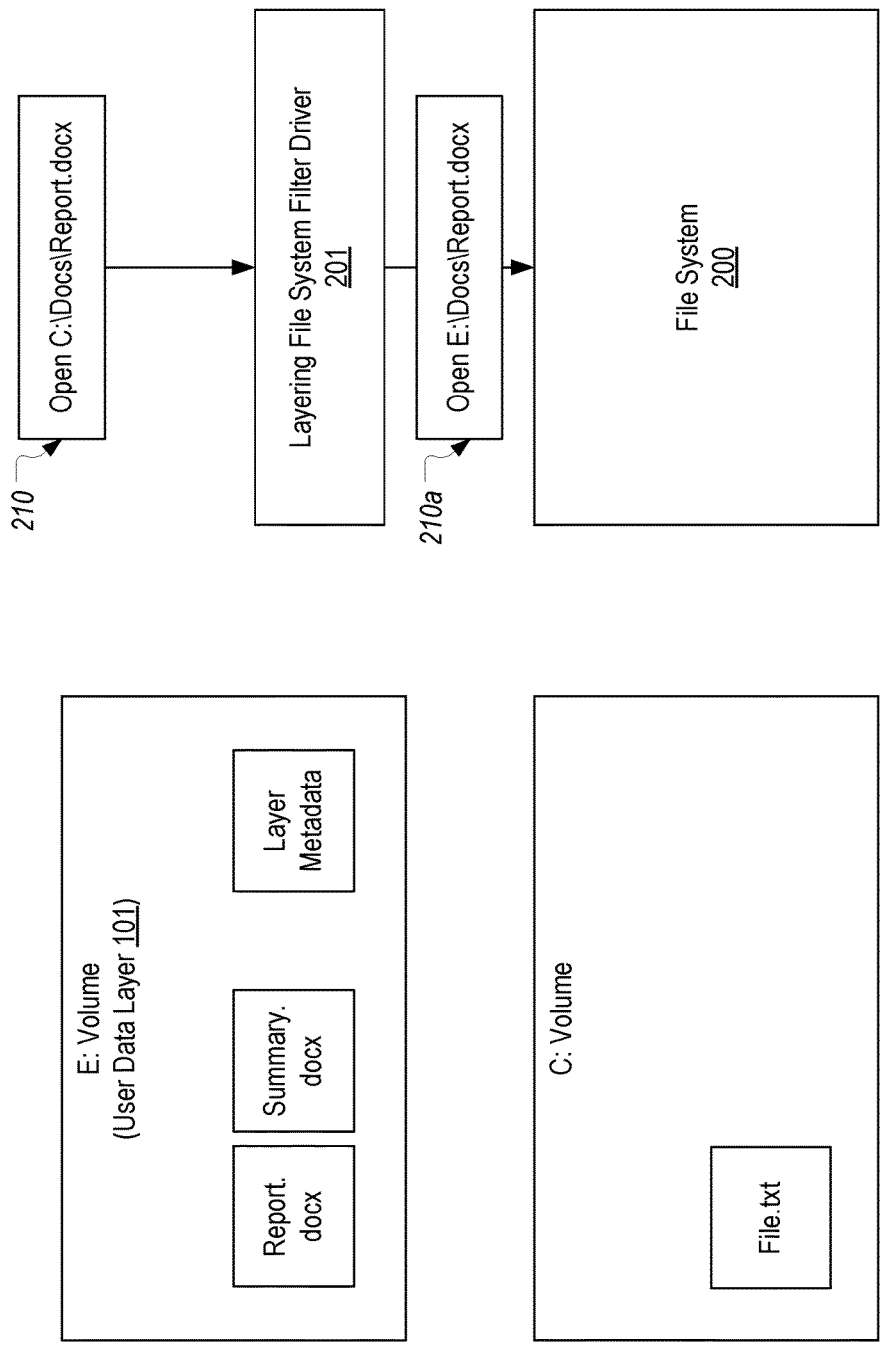
FIGS. 2A and 2B generally illustrate how a layering system can reroute file system or registry operations based on layer metadata of a mounted layer.
Figure 2B:
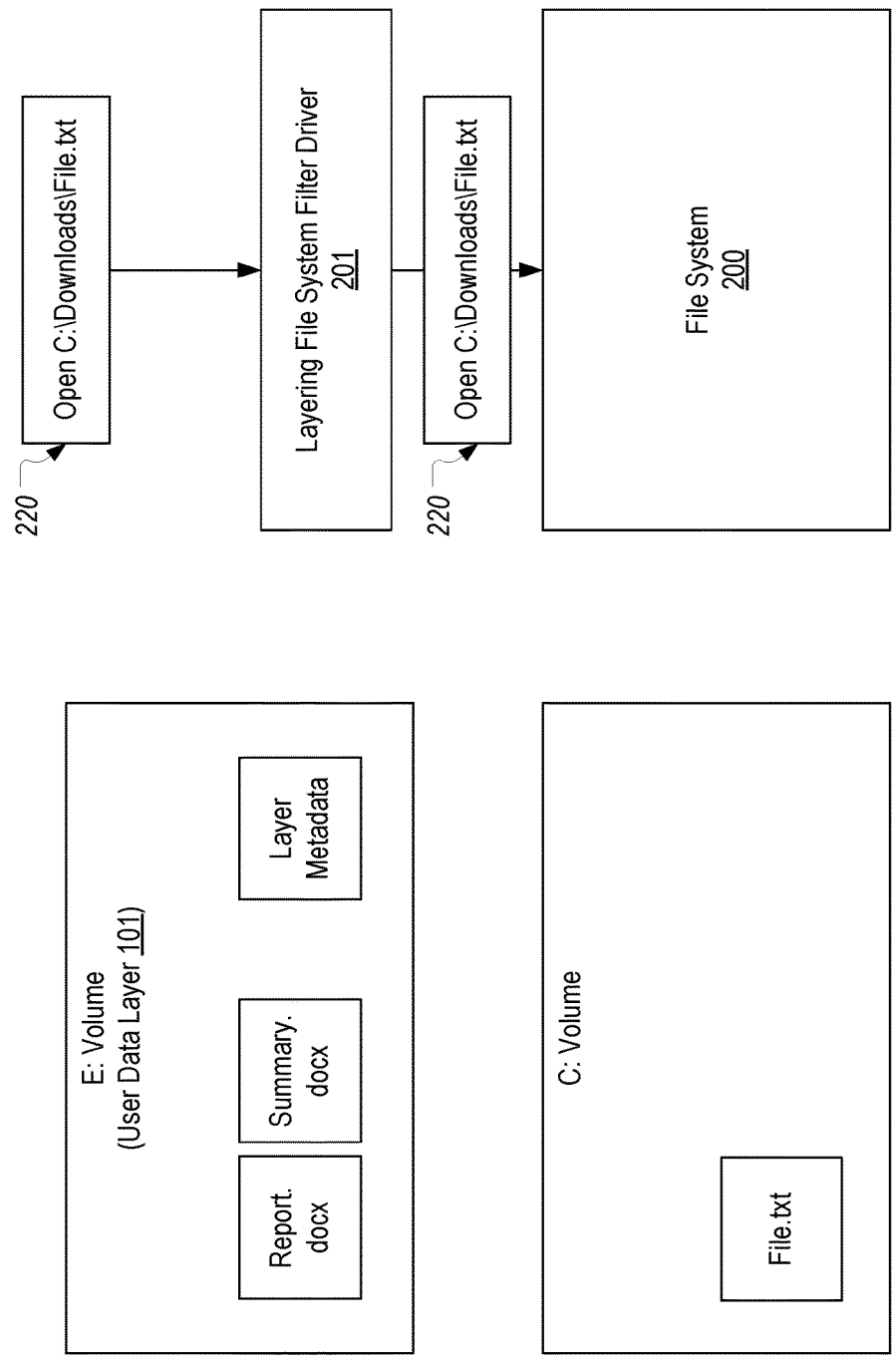
Figure 3:
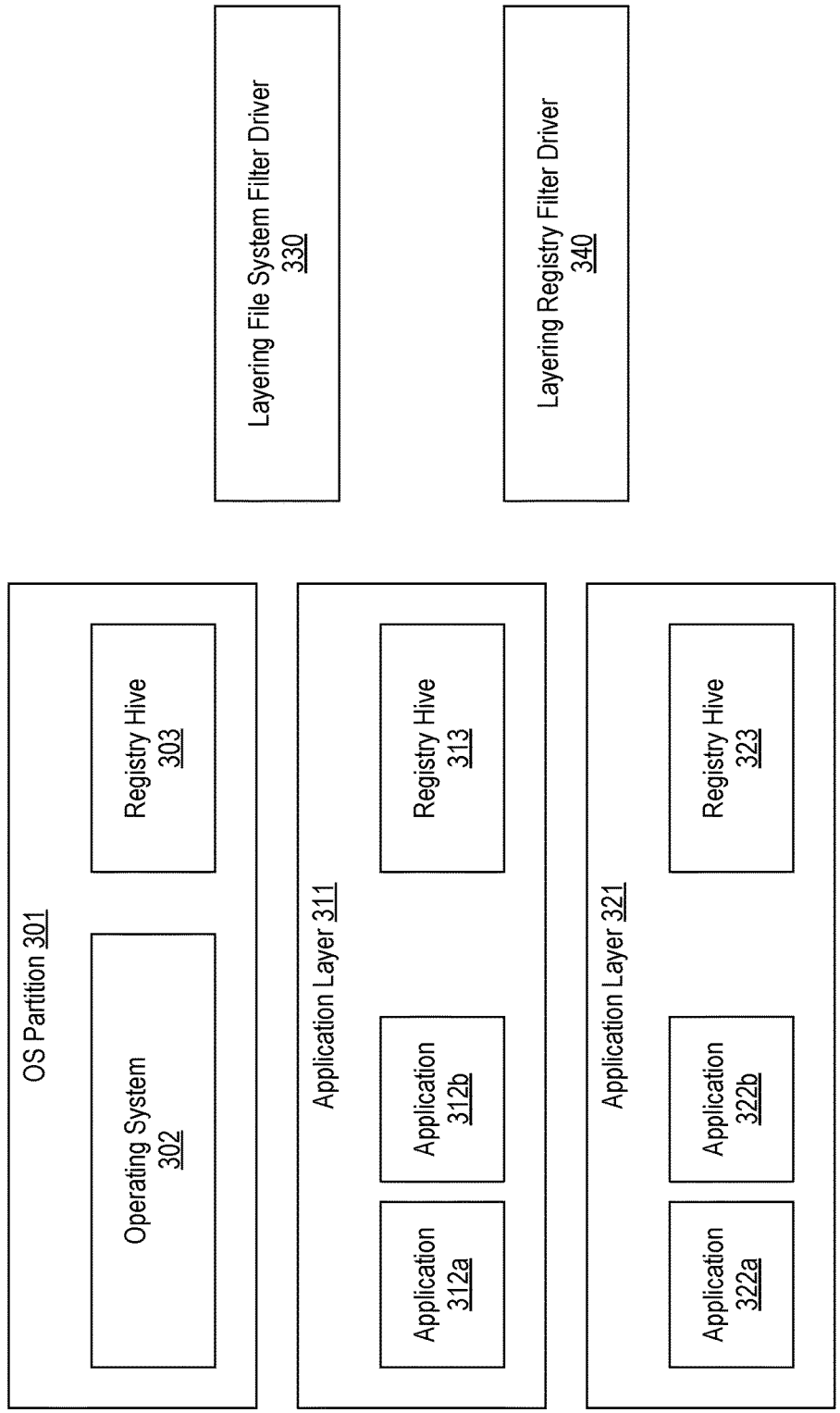
FIG. 3 illustrates how an operating system and each layer can include at least one registry hive storing configuration settings.
Figure 3A:
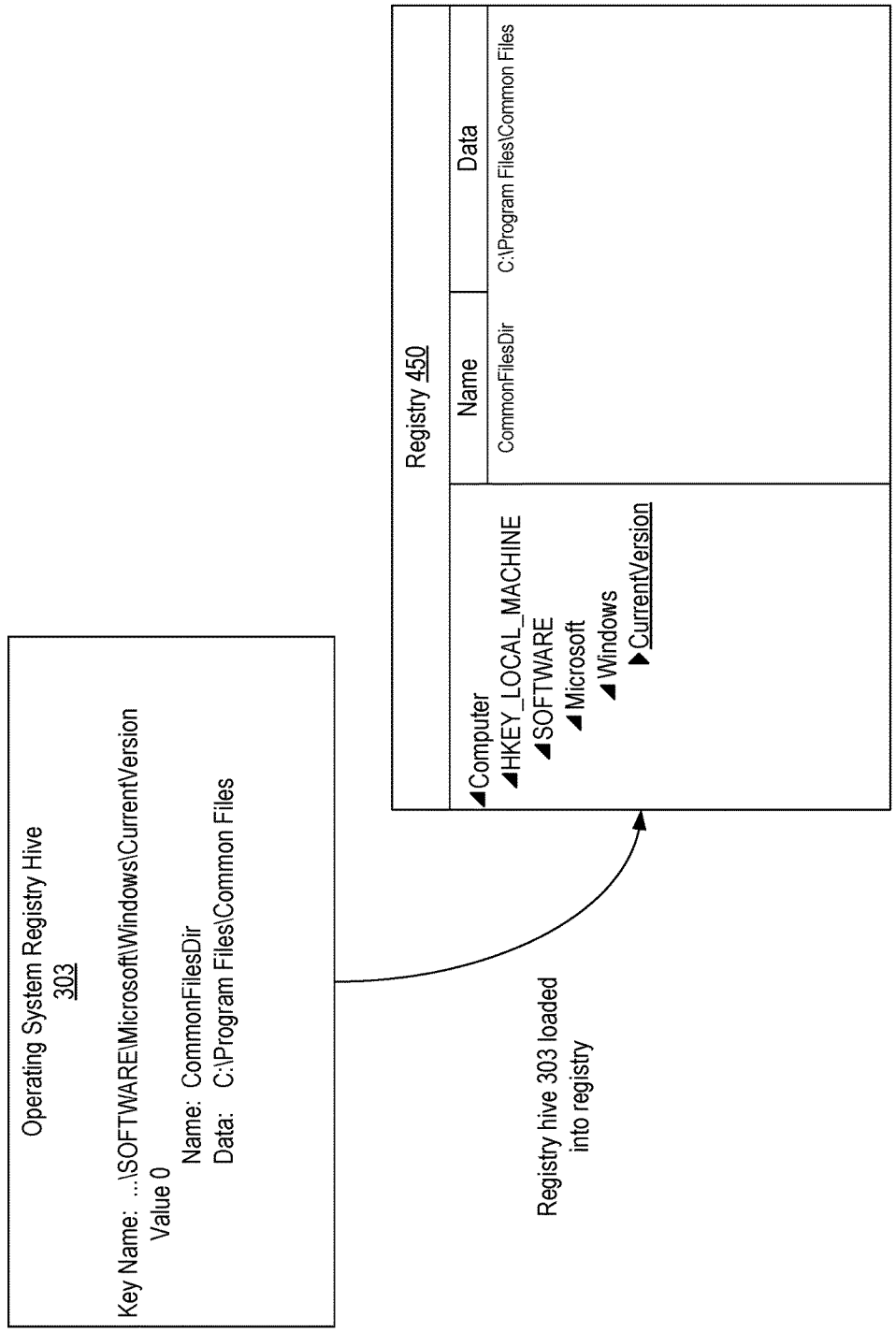
FIGS. 3A-3C illustrate how layer registry hives can be loaded into the registry.
Figure 3B:
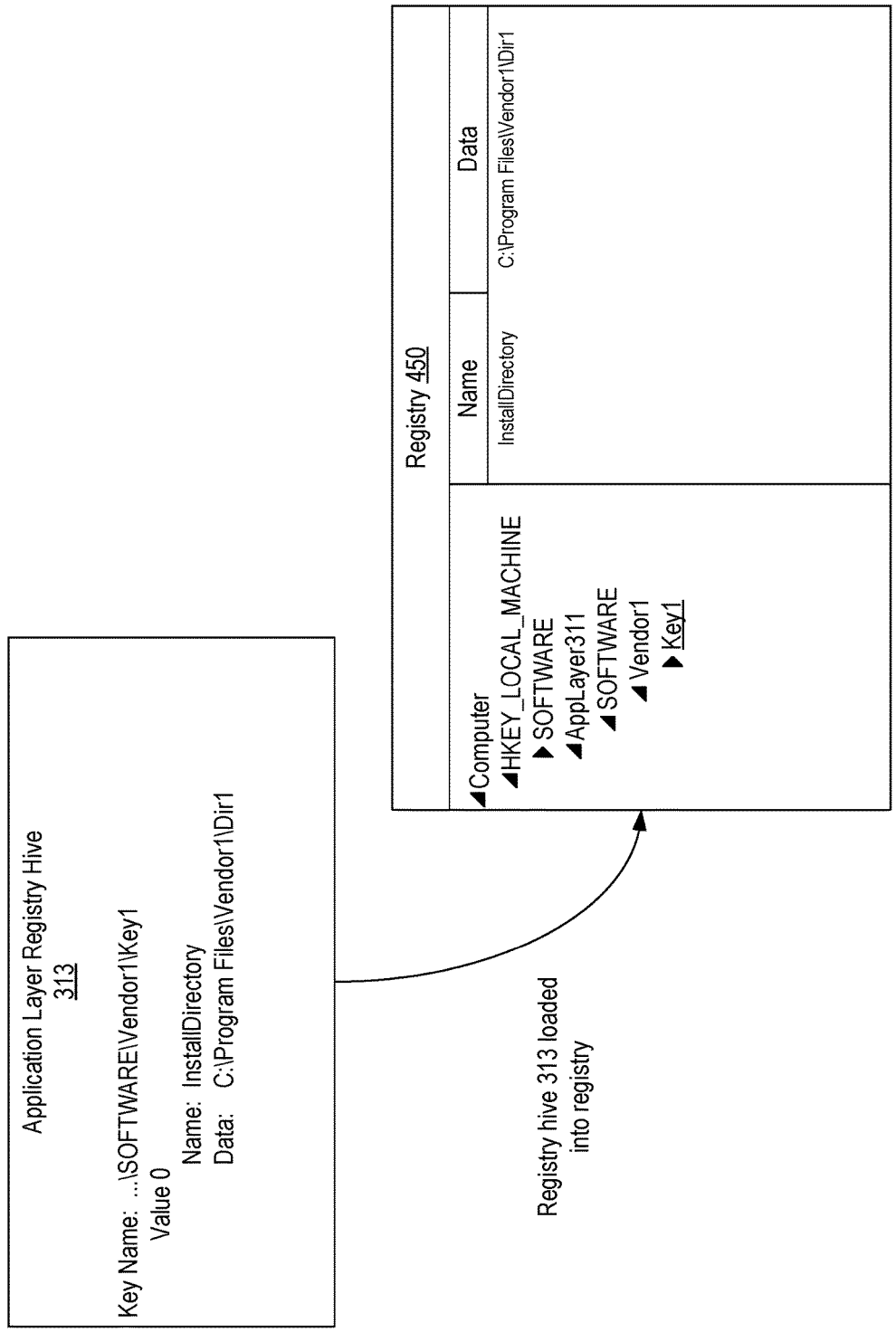
Figure 3C:
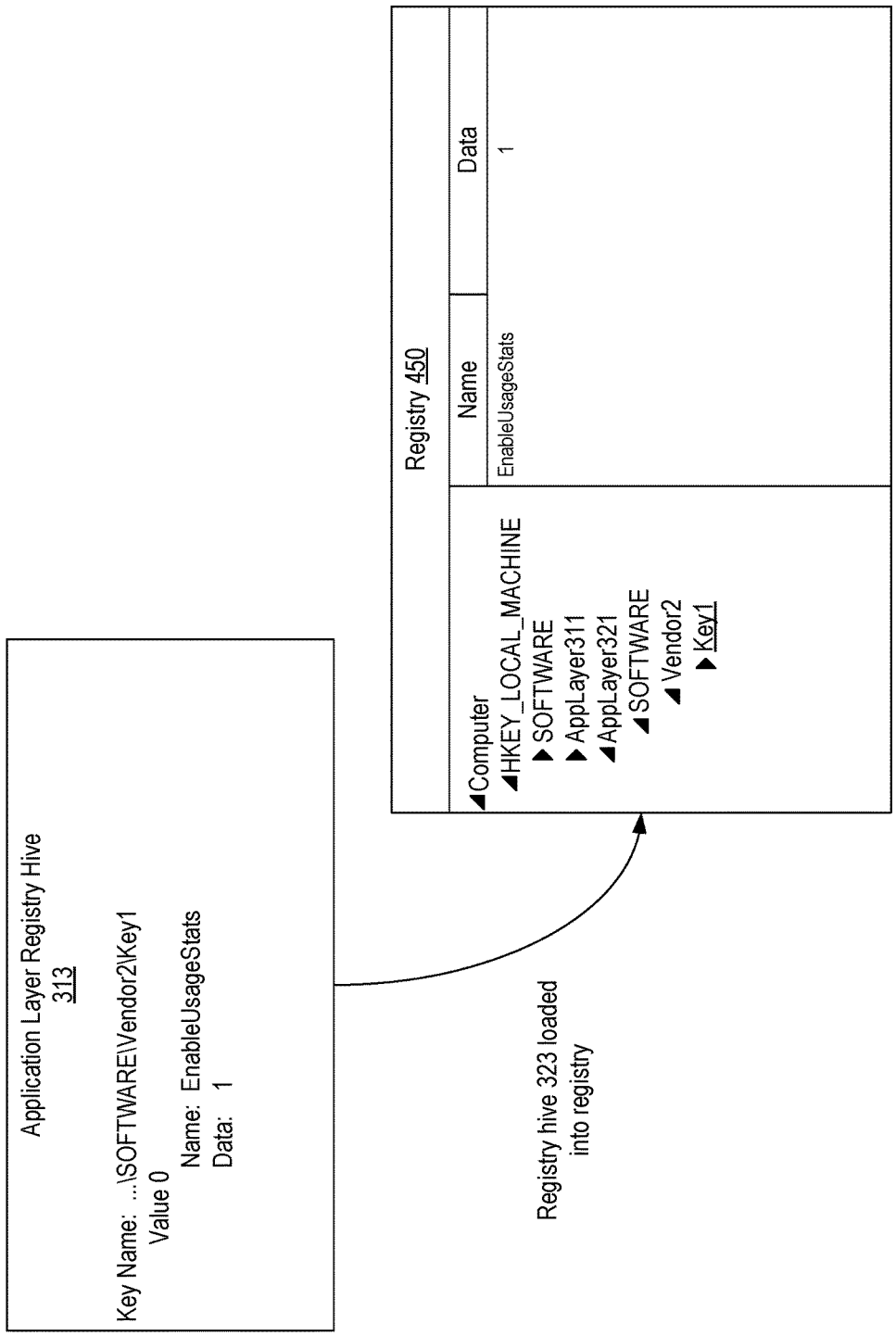
Figure 4:
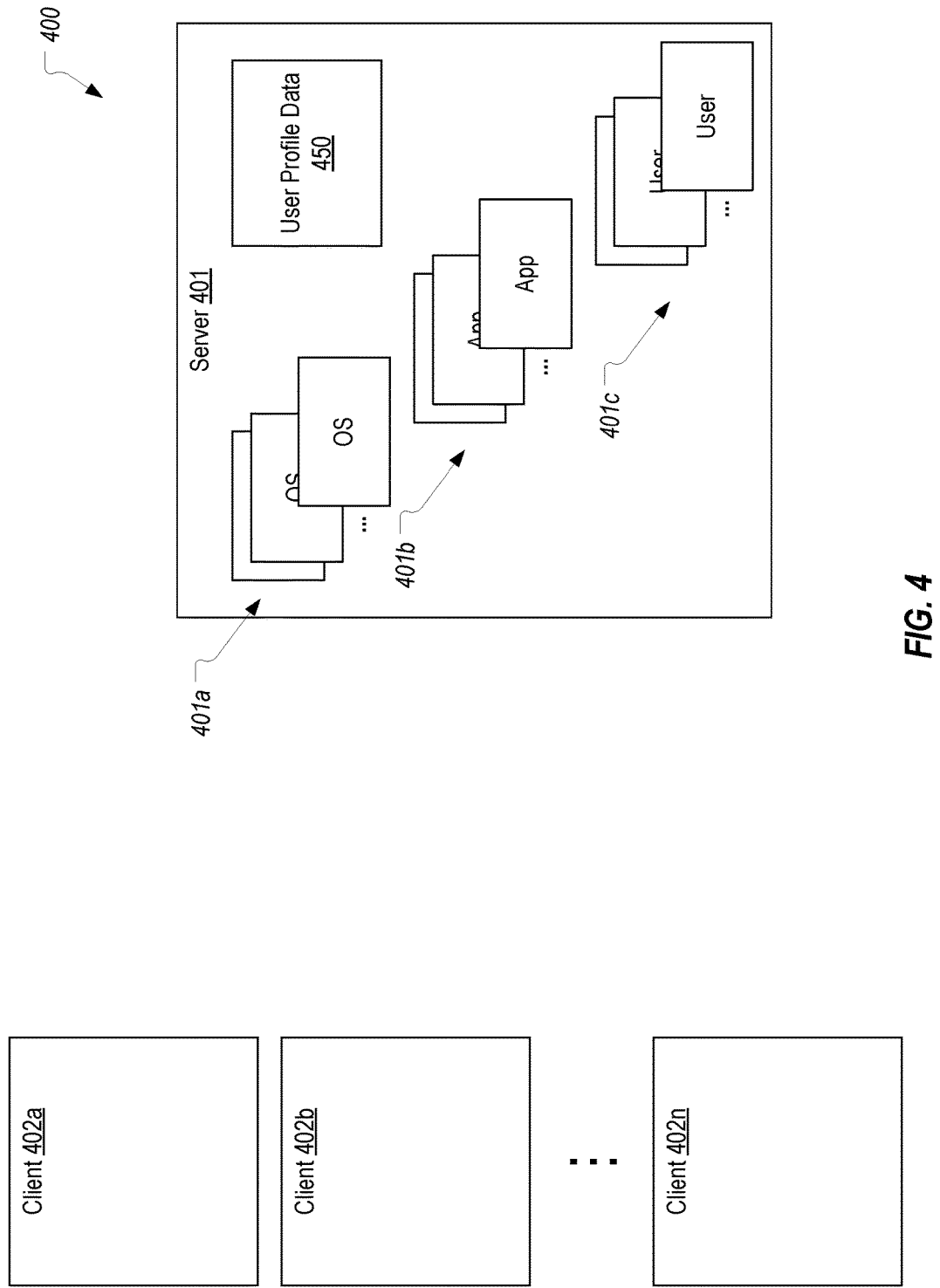
FIG. 4 illustrates an example computing environment in which the present invention can be implemented.

FIG. 4 illustrates the general client/server architecture 400 that can be employed to implement embodiments of the present invention. As shown, architecture 400 can include a server 401 and a number of clients 402a-402n. In some embodiments, server 401 can represent more than one server. For simplicity, however, a single server will be depicted. Server 401 is tasked with storing one or more OS layers 401a, a plurality of application layers 401b, and a plurality of user data layers 401c. As mentioned above, each of these layers could be a separate VHD file (or virtual disk). Server 401 can also maintain user profile data 450 which identifies the available user profiles for each user. Although not shown, server 401 can also provide an authentication service.

Each of OS layers 401a can contain an operating system. In cases where clients will only be provided access to a single operating system version, it is possible that only a single OS layer may reside on server 401. However, it is more likely that server 401 will maintain a number of different OS versions and/or configurations, in which cases, an OS layer for each version/configuration will be provided. Each of application layers 401b can include one or more applications and any supporting files and/or registry data for those applications. Each of user data layers 401c can represent a different user profile. More particularly, each user data layer can store any files and/or settings for a specific user. Accordingly, each user data layer can represent/define a particular user profile for a particular user. In accordance with embodiments of the present invention, more than one user data layer can be maintained for a single user thereby allowing the single user to have multiple user profiles.

Figure 5A:
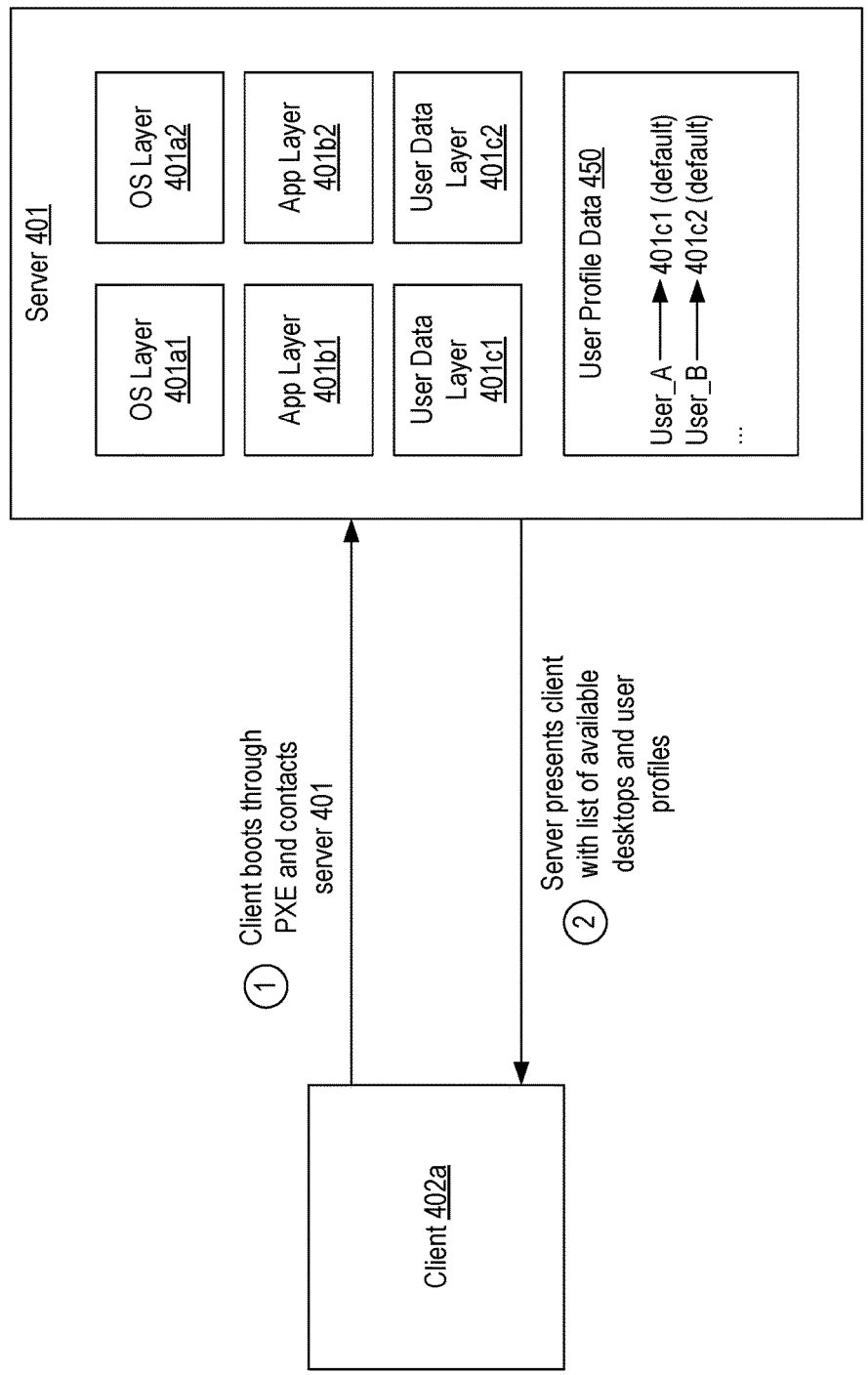
FIGS. 5A-5C depict a process by which a user can select a particular user profile.
Figure 5B:
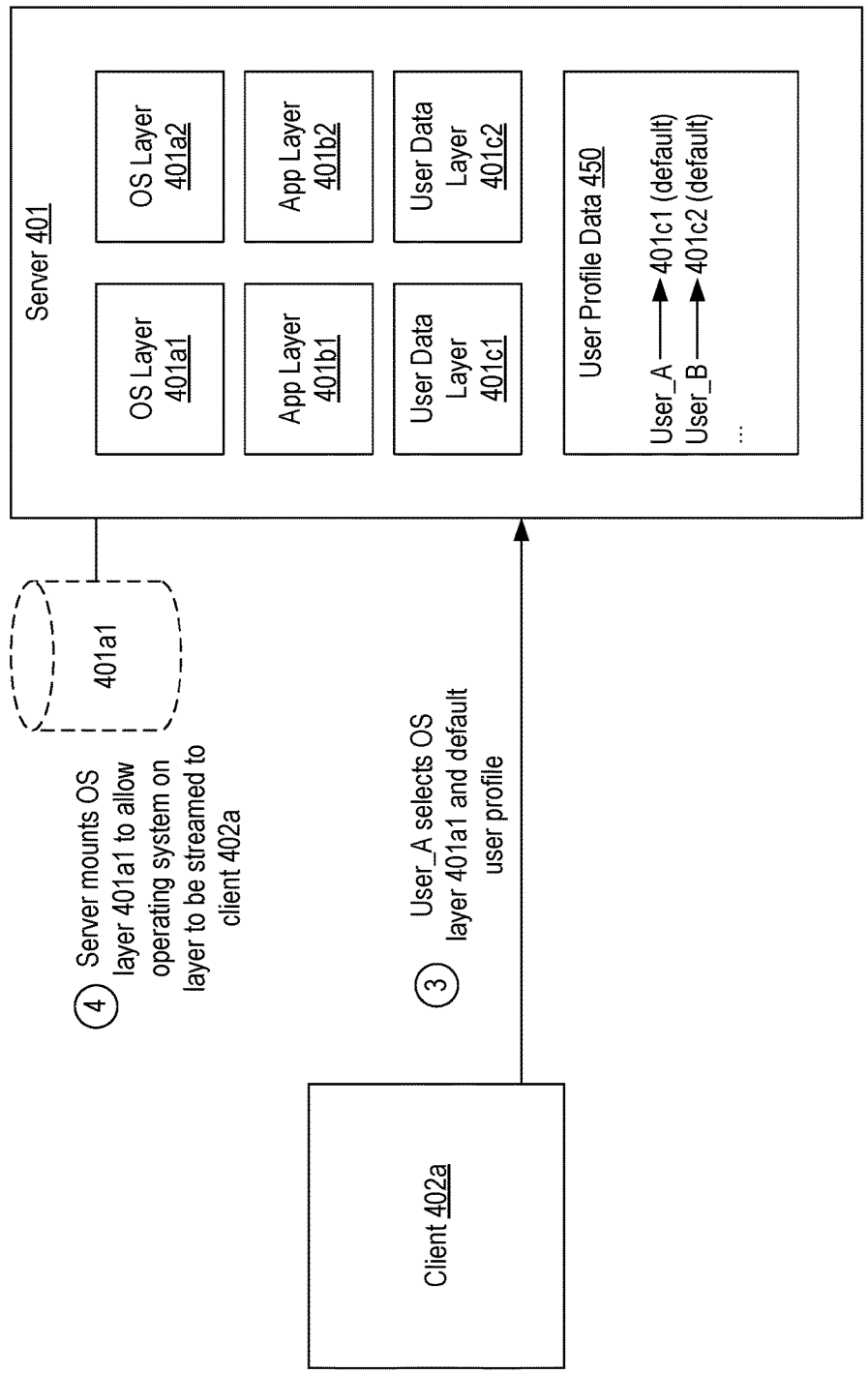
Figure 5C:
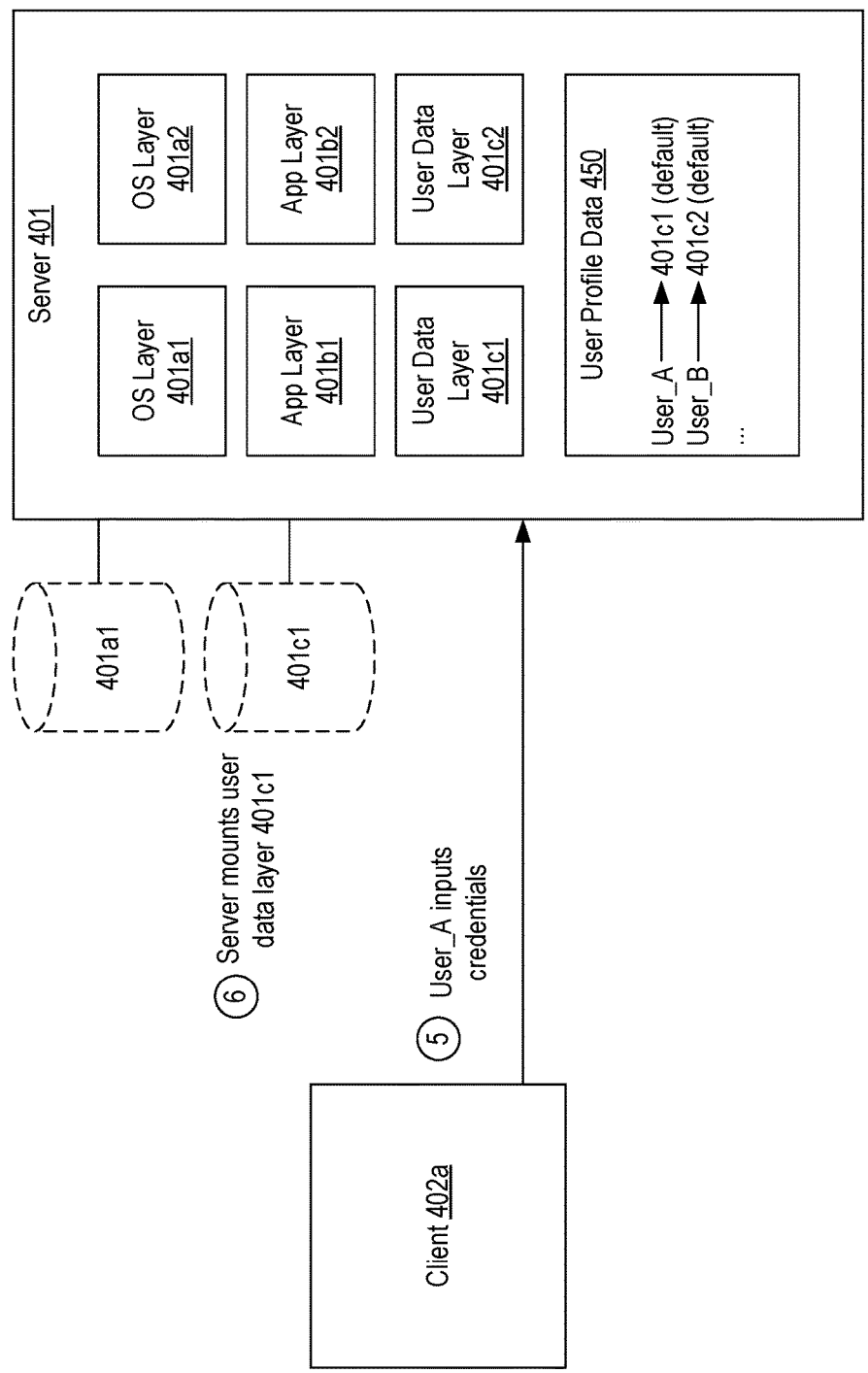

FIGS. 5A-5C illustrate a sequence of steps that can be performed when a user employs client 402a to log in to a desktop provided by server 401. In this example, it will be assumed that server 401 provides the desktop via OS streaming. Also, in this example, it will be assumed that server 401 initially maintains user data layer 401c1 which defines a default user profile for User_A and user data layer 401c2 which defines a default user profile for User_B. Of course, server 401 may typically store a large number of user data layers for a large number of users. User profile data 450 is also shown as initially including a mapping between User_A and user data layer 401c1 and a mapping between User_B and user data layer 401c2. These depicted mappings are intended only to represent that server 401 maintains an identification of which user data layers pertain to which users, and server 401 may employ any technique for maintaining such identifications.

As represented by step 1 in FIG. 5A and in response to User_A interacting with client 402a, client 402a can boot over the network (e.g., via PXE) and contact server 401. As part of this booting, an identifier of User_A can be supplied to server 401. In response and in step 2, server 401 will respond by presenting a list of available desktops as well as a list of available user profiles. Which desktops are presented to a particular user can depend on a number of factors (e.g., group policy, which client or client architecture is employed, etc.) and is not essential to the present invention. In this case, it will be assumed that User_A is presented with two desktop options: a first option representing OS layer 401a1 and a second option representing OS layer 401a2. OS layers 401a1, 401a2 could represent different versions of the same operating system, different configurations of the same operating system version, or two different operating systems.

To determine which user profiles to include in the list presented to User_A, server 401 can access user profile data 450 to identify which user data layers are associated with User_A. In this case, it will be assumed that user profile data 450 identifies only user data layer 401c1 as being associated with User_A and therefore the list supplied to client 402a will only identify a single user profile. User profile data 450 can include additional descriptive information about each user profile. For example, in addition to defining the mapping between User_A and user data layer 401c1, user profile data 450 can also identify user data layer 401c1 as a default user profile. In such cases, the list presented to client 402a can include this descriptive information (i.e., the name of the user profile) to better inform User_A of the purpose of each available user profile. In addition to identifying each of User_A's available user profiles, server 401 can also present an option to create a new user profile. The process that can be performed when User_A selects to create a new user profile will be described in detail below.

Turning now to FIG. 5B, in response to server 401 presenting the available desktops and user profiles, it is assumed that User_A selects OS layer 401a1 (which, for example, may provide a Windows 10 desktop) as well as the default user profile. In response and in step 4, server 401 will mount OS layer 401a1 (as represented by the dashed cylinder) to thereby allow client 402a to commence booting from OS layer 401a1 (i.e., to commence streaming the OS to client 402a). One of skill in the art would understand how OS streaming is accomplished and therefore a detailed description of OS streaming will not be provided. Suffice it to say that client 402a can include appropriate components to redirect I/O requests to the mounted OS layer 401a1 so that the operating system will execute as if it were locally installed on client 402a.

Once the operating system on OS layer 401a1 has booted, it will prompt User_A to input credentials as is typical. In step 5 shown in FIG. 5C, User_A's credentials will be sent to server 401 (e.g., to an authentication service on server 401) for authentication (e.g., using Active Directory) or otherwise authenticated locally. Assuming the credentials are verified and in step 6, server 401 will then apply the selected user profile by mounting user data layer 401c1. Although not shown, server 401 will also mount the appropriate application layer(s). In some embodiments, which application layers are mounted can be defined within user data layer 401c1. In such cases, user data layer 401c1 can be mounted first and then any application layer identified in the user data layer can be mounted. As described in the background, client 402a can include a layering file system filter driver and a layering registry filter driver (which may be part of OS layer 401a1) to abstract the fact that the OS, applications, and user data are on separate layers.

Figure 6A:
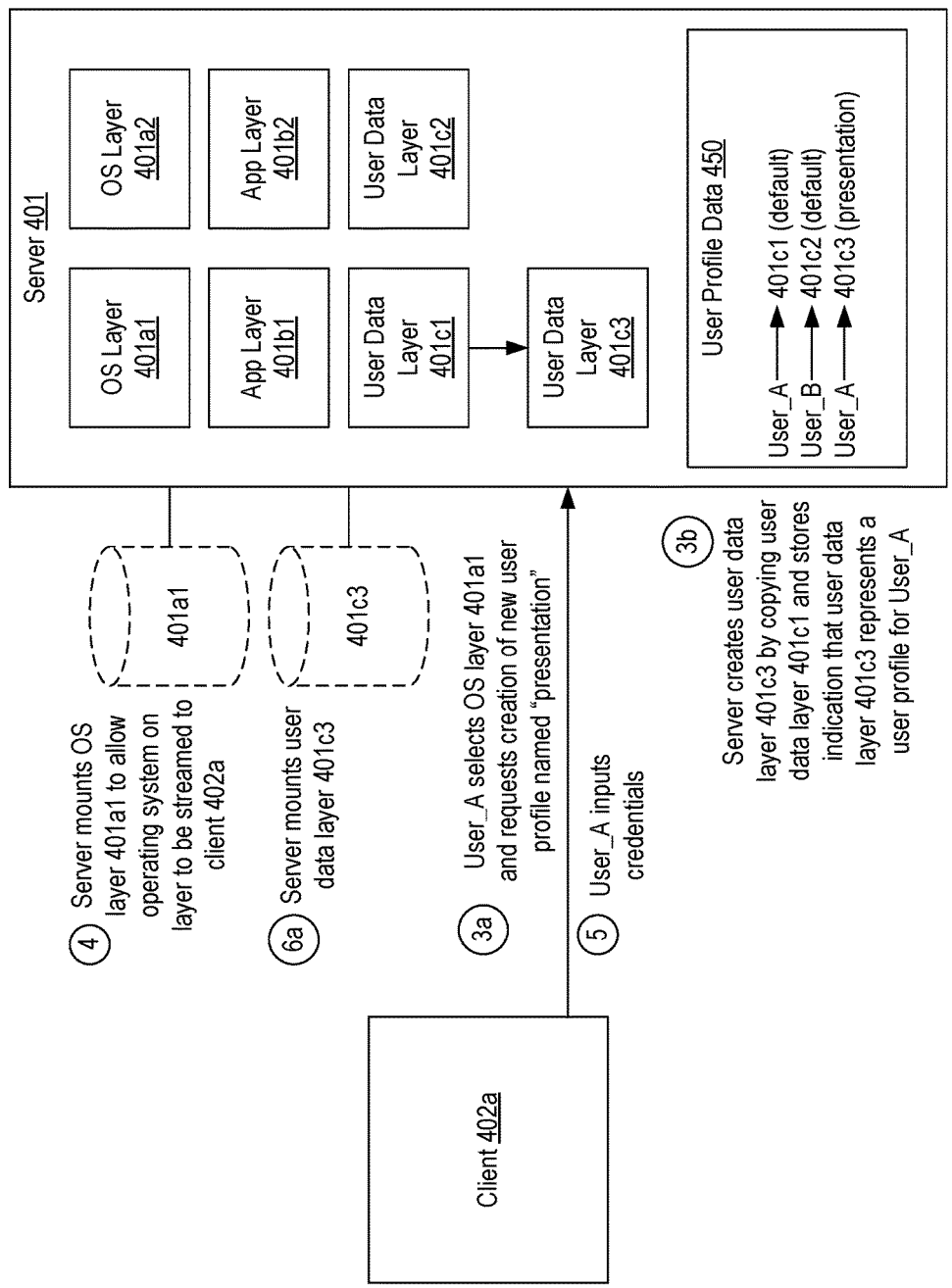
FIGS. 6A-6C depict a process by which a user can create a new user profile.
Figure 6B:
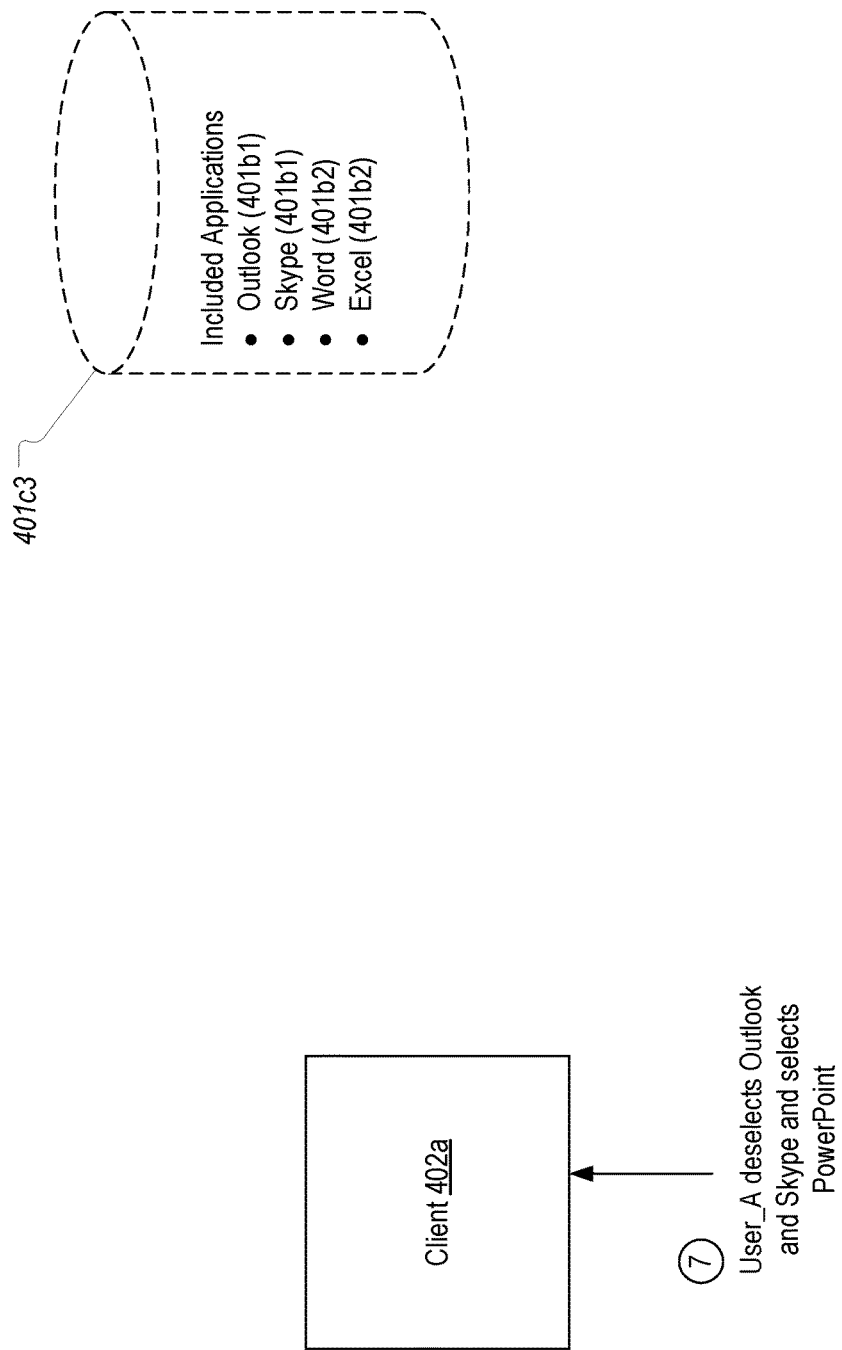
Figure 6C:
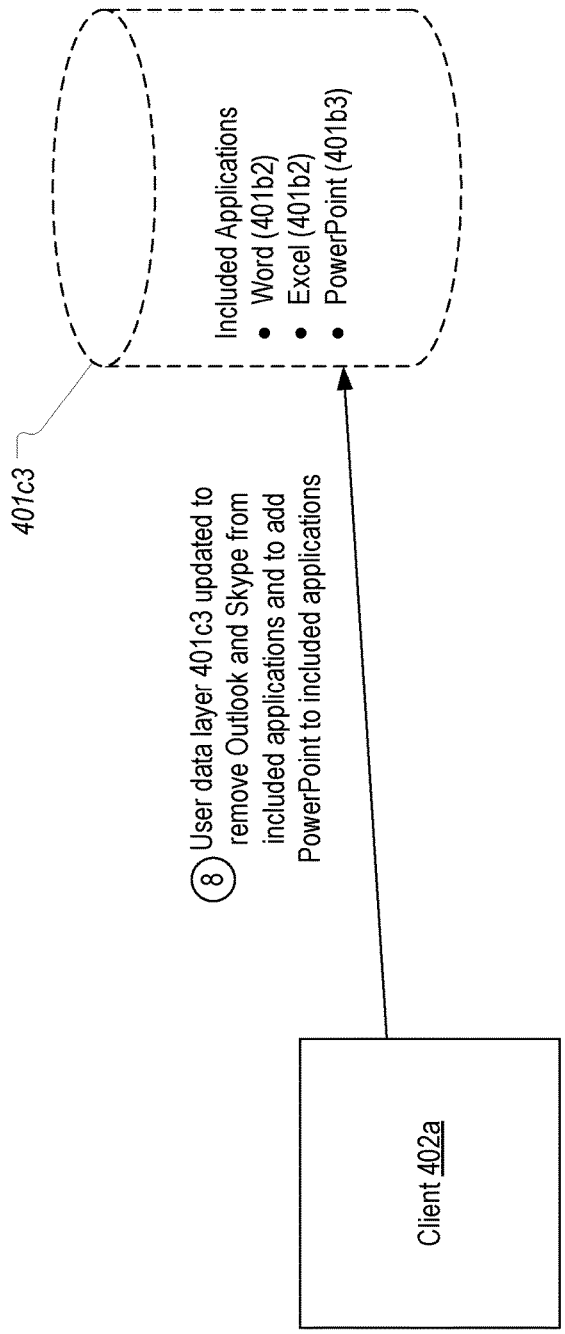

FIGS. 6A-6C illustrate the different steps that are performed when a user requests the creation of a new user profile. FIG. 6A is based on FIGS. 5B and 5C. As shown in step 3a, it is again assumed that User_A selects OS layer 401a1. However, in this example, User_A has requested the creation of a new user profile named "presentation." In some embodiments, the user can be prompted to provide a name upon requesting the creation of a new user profile. In response and in step 3b, server 401 can create a copy of user data layer 401c1 (i.e., a copy of User_A's default user profile) and store the copy as user data layer 401c3. Server 401 can also update user profile data 450 to include an indication that user data layer 401c3 is a user profile for User_A named "presentation." Steps 4 and 5 will be performed in the same manner as depicted in FIGS. 5B and 5C. Then, in step 6a, server 401 will mount user data layer 401c3.

Because user data layer 401c3 is a copy of user data layer 401c1, the presentation profile will initially appear the same as the default user profile. User_A may then make any desired changes to the user profile as may typically be done when logged in to a desktop. For example, User_A may change the desktop background, font size, notification settings, pinned applications, etc. These types of settings will be persisted on user data layer 401c3 using the layering techniques described above. More particularly, the user-specific settings will be stored on user data layer 401c1 rather than on OS layer 401a1 or on any application layer due to the layering filter drivers so that the same settings will exist when user data layer 401c1 is subsequently mounted.

In addition to these "look and feel" type user settings, User_A can also be provided with the option to customize which applications will be provided when the current user profile is subsequently selected. For example, a configuration application (which may typically be included in the OS layer and may run as a background application that can be accessed via the Windows system tray (e.g., the OSM Tray in the Wyse vWorkspace solution)) may present each application that is currently included in the user profile as well as each application that is available but not currently included. This configuration application may also present an option for renaming the current user profile. Since User_A intends to use the presentation user profile when making a presentation, User_A may deselect Outlook and Skype and select Word, Excel, and PowerPoint.

Assuming that Outlook and Skype were included in the default user profile, these applications will currently be available. For example, user data layer 401c1 may include an indication that application layer(s) containing Outlook and Skype should be mounted when user data layer 401c3 is mounted. In such a case, the configuration application can cause user data layer 401c3 to be updated to no longer indicate that the application layer(s) containing Outlook and Skype should be mounted.

FIGS. 6B and 6C illustrate this process of customizing the user profile. For this example, it is assumed that user data layer 401c3 includes a list of included applications that identifies Outlook, Skype, Word, and Excel. It is also assumed that Outlook and Skype are included in application layer 401b1 while Word and Excel are included in application layer 401b2. Of course, each application could be (and may typically be) stored on a separate application layer. Also, the depicted manner in which a user data layer identifies which application layers to mount is conceptual only and any suitable manner could be employed.

In step 7, it is assumed that User_A has provided input to client 402a which deselects Outlook and Skype and selects PowerPoint. As mentioned above, in some embodiments, an application that is accessible via a system tray icon may be employed to present the available customizations to User_A as well as to receive User_A's customization input. In response and as shown in FIG. 6C, user data layer 401c3 can be updated so that Outlook and Skype are no longer identified as being included and so that PowerPoint is identified as being included. As indicated, it is assumed that PowerPoint is stored on application layer 401b3. At this time and while the user is still logged in, the application layers containing deselected applications could be unmounted and the application layers containing newly selected application could be mounted. Alternatively, no mounting or unmounting may be made during the current session such that the changes will not appear until the user next logs in to the user profile.

After these changes are made and when User_A subsequently attempts to log in to a desktop, he will be presented with the option of selecting the default user profile or the presentation profile (as well as possibly having the option to create a new user profile). If User_A selects the presentation profile, user data layer 401c3 will be mounted and layered with the selected OS layer. Additionally, application layers 401b2 and 401b3 will be mounted and layered so that Word, Excel, and PowerPoint will be accessible on the desktop while user data layer 401b1 will not be mounted so that Outlook and Skype are not accessible. A component of the selected OS layer or a component on server 401 can be configured to identify, from the selected user data layer, which application layers should be mounted.

In summary, the present invention allows a user to create a number of different user profiles in a way that is independent of the desktop. Each user profile can be stored as a relatively small VHD file (or other suitable layer format). This is in contrast to creating a separate desktop (e.g., in a form of virtual machines) for each user profile which would require a large amount of storage. The provision of multiple user profiles also provides the benefit of allowing the user to control which applications will be loaded upon login.

One particular example where the present invention can be beneficial is in the case where the user is doing a presentation. Without the present invention, the user would be required to log in to the default user profile which would in turn cause each application made available to the user to be loaded, including logging the user in to the various applications such as Outlook which may generate notifications that would disturb the presentation. In such a case, to avoid the disturbance of receiving a notification, the user would need to shut down or log out of any application that could potentially generate a notification. In contrast, with the present invention, the user could create a presentation user profile which will cause only presentation applications to be loaded. Therefore, when the user desires to do a presentation, he can simply log in to the presentation user profile without any concern that an application that may generate notifications will be loaded.

As another example, the user may desire to create a personal user profile that does not include applications that the user employs when working. In this scenario, the user could log in to the personal user profile at times when he may desire to view entertainment or when he may desire to allow another user (e.g., a child) to view entertainment. Because the work applications will not be loaded, there will be less concern that work-related information will be improperly or accidentally accessed. In short, the present invention allows the user to obtain a desktop that is customized for a particular scenario without the necessity of creating and maintaining multiple desktops.

Because user profiles are provided using layering, the user profile is independent of the operating system. In particular, because the user profile data is stored in a user data layer separate from the operating system layer and application layers, the same user profile data can be applied to different OS versions and/or architectures. In cases where a certain type of user data may not be compatible with all supported OS versions/architectures, a user data layer can simply maintain different sets of the user data (e.g., one set that is compatible with Windows 7 and another set that is compatible with Windows 10).

Figure 7:
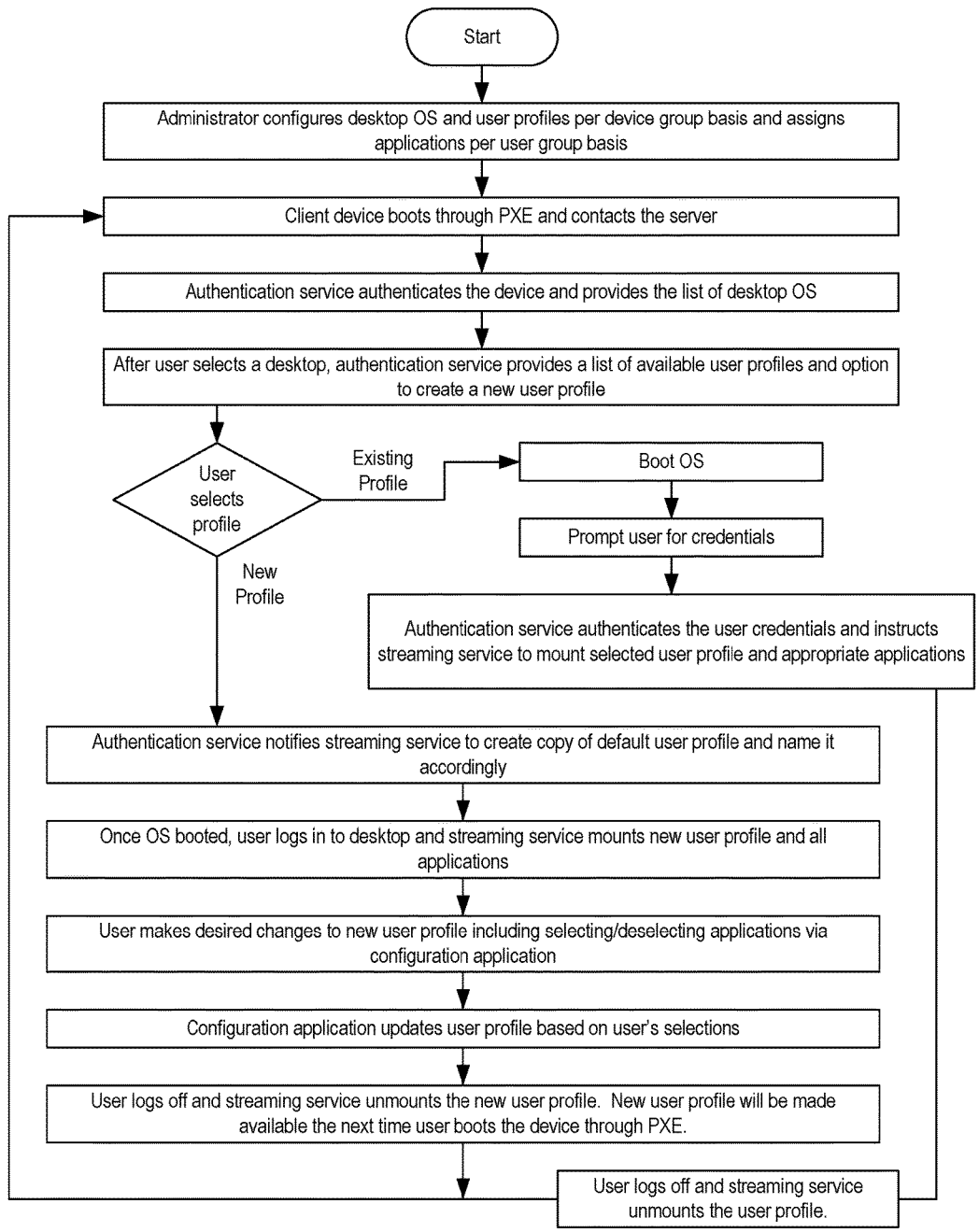
FIGS. 7 and 8 each provide a flowchart of a process for providing multiple user profiles to a single user in different virtualization environments.

FIG. 7 provides a flowchart that corresponds substantially with the above described process when implemented in an OS streaming environment. Initially, an administrator can configure the desktops that will be made available as well as the default user profiles on a device group basis and can also assign applications on a user group basis. In some embodiments, this can be accomplished using Active Directory or another suitable management tool. Once these configurations are completed, users will be able to log in to a desktop via client devices.

Next, when a user desires to log in, he can cause a client device to boot through PXE to contact the server. An authentication service on the server can authenticate the device and provide a list of desktops that the administrator has made available to the particular client device. In conjunction with the user selecting a desktop, the authentication service can also provide a list of available user profiles and an option to create a new user profile. If the user has not previously created a new user profile, this list may only include the default user profile. In contrast, if the user has previously created any new user profiles, these new user profiles will be presented in addition to the default user profile.

If the user selects an existing user profile, the operating system will boot and prompt the user for credentials. The authentication service can authenticate the user credentials and then instruct the streaming service to mount the user data layer corresponding to the selected user profile and to mount any application layers containing applications that the user profile indicates should be available when the user profile is selected.

In contrast, if the user selects a new user profile, the authentication service can notify the streaming service to create a copy of the user data layer defining the default user profile and name it accordingly. Once the operating system has booted and the user has been authenticated, the authentication service will instruct the streaming service to mount the newly created user data layer. Because the newly created user data layer is a copy of the default user data layer, it will identify that all applications available to the user should be mounted. Therefore, the streaming service will mount the application layers for all the applications.

The user can then interact with the desktop to customize it. These customizations will be persisted in the newly created user data layer. The user can also interact with the configuration application to specify which applications should be included in the new user profile. In response, the configuration application will make appropriate changes to the user data layer. The user can then log off thereby causing the streaming service to unmount the new user data layer representing the new user profile. The new user profile can then be made available to the user when the user next boots the client device (or another client device in the device group).

Figure 8:
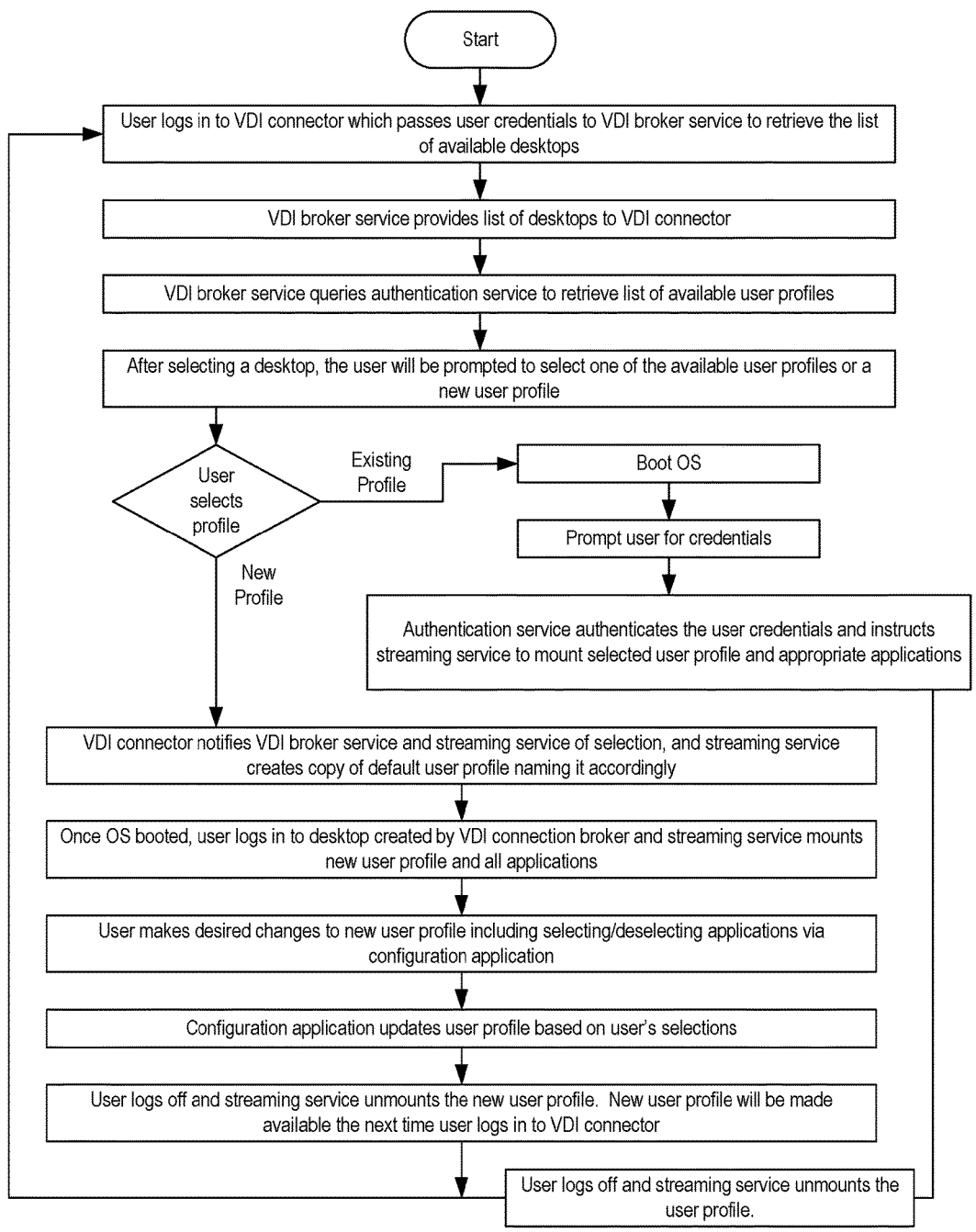

FIG. 8 provides a flowchart for the above-described process when implemented in a VDI environment. When a user logs in to the VDI connector, the VDI connector will pass the user credentials to the VDI broker service to retrieve the list of available desktops. Although not shown, an administrator can define which desktops will be available to which users in a similar manner as described above. However, since the desktops will be executed on virtual machines in the VDI environment, the availability of a desktop will not be tied to the client device.

In addition to providing the available desktops to the VDI connector, the VDI broker service can also query the authentication service, using the user credentials, to retrieve the list of available user profiles and then send the available user profiles to the VDI connector for presentation to the user. In conjunction with selecting one of the available desktops, the user will also be prompted to select one of the available user profiles or to create a new user profile. The remaining process is substantially similar to the process depicted in FIG. 7 and will therefore not be described further.

Figure 9:
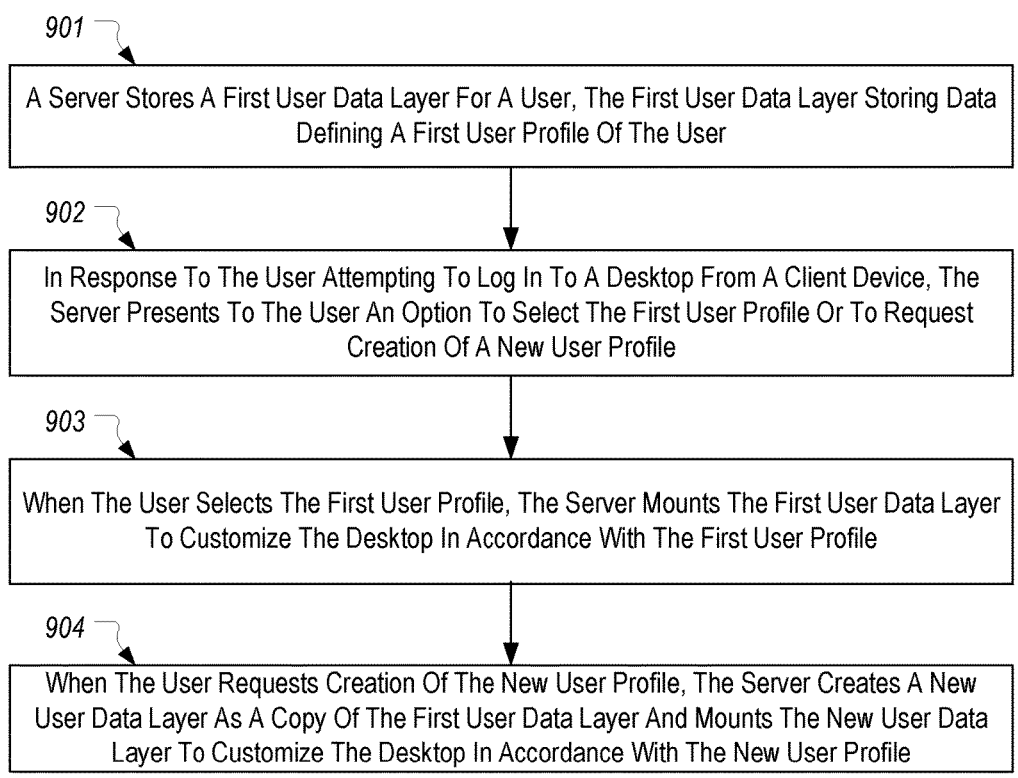
FIG. 9 illustrates a flowchart of an example method for providing multiple user profiles to a single user.

FIG. 9 provides a flowchart of an example method 900 for providing multiple user profiles to a single user. Method 900 can be implemented by a server such as server 401.

Method 900 includes an act 901 of storing a first user data layer for a user, the first user data layer storing data defining a first user profile of the user. For example, server 401 can store user data layer 401c1 for User_A.

Method 900 includes an act 902 of, in response to the user attempting to log in to a desktop from a client device, presenting to the user an option to select the first user profile or to request creation of a new user profile. For example, User_A can be presented with an option to select the default user profile defined by user data layer 401c1 or to request creation of a new user profile.

Method 900 includes an act 903 of mounting the first user data layer to customize the desktop in accordance with the first user profile when the user selects the first user profile. For example, server 401 can mount user data layer 401c1 when User_A selects the default user profile.

Method 900 includes an act 904 of creating a new user data layer as a copy of the first user data layer and mounting the new user data layer to customize the desktop in accordance with the new user profile when the user requests creation of the new user profile. For example, server 401 can create user data layer 401c3 as a copy of user data layer 401c1 and then mount user data layer 401c3.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a server in a virtualization environment, for providing multiple user profiles to a user to thereby allow the user to select from among the multiple user profiles when logging in to a desktop, the method comprising:
   storing, on the server, a first user data layer for a user, the first user data layer storing data defining a first user profile of the user; and
   in response to the user attempting to log in to a desktop from a client device, presenting, on the client device from which the user is attempting to log in to the desktop, an option for user to select the first user profile to be used to customize the desktop or to request creation of a new user profile to be used to customized the desktop;
   wherein, when the user selects the first user profile, the server mounts the first user data layer to customize the desktop in accordance with the first user profile and provides, to the client device, the desktop that has been customized in accordance with the first user profile;
   whereas, when the user requests creation of the new user profile, the server creates and stores a new user data layer as a copy of the first user data layer, the new user layer defining new user profile of the user such that the server stores multiple user data layers for the user defining multiple user profiles for the user, wherein, when the user requests creation of the new user profile, the server also mounts the new user data layer that was created and stored to thereby customize the desktop in accordance with the new user profile and provides, to the client device, the desktop that has been customized in accordance with the new user profile.

2. The method of claim 1, wherein the new user data layer includes a listing of application layers that should be mounted when the new user data layer is mounted, the method further comprising:
   mounting each application layer included in the listing when the new user data layer is mounted.

3. The method of claim 2, wherein the application layers include a plurality of applications, the method further comprising:
   receiving user input that requests that a first application of the plurality of applications not be made available when the new user profile is selected; and
   updating the listing of application layers to not include an application layer that includes the first application.

4. The method of claim 3, further comprising:
   after the user logs off of the desktop and in response to the user subsequently attempting to log in to a desktop from a client device, presenting an option for the user to select the first user profile to be used to customize the desktop or the new user profile to be used to customize the desktop;
   in response to the user selecting the new user profile, mounting the new user data layer to customize the desktop in accordance with the new user profile; and
   mounting each application layer included in the listing such that the application layer that includes the first application is not mounted.

5. The method of claim 4, wherein the new user data layer and each application layer included in the listing is mounted on the server and streamed to the client device.

6. The method of claim 4, wherein the new user data layer and each application layer included in the listing is mounted on a virtual machine executing on the server.

7. The method of claim 4, wherein the first user data layer and the new user data layer are each a separate VHD file.

8. The method of claim 1, further comprising:
   upon the user logging off of the desktop, unmounting and storing the new user data layer such that any changes to the new user data layer that are made while the user is logged in to the desktop are persisted.

9. The method of claim 1, wherein the server also stores a second user data layer for the user, the second user data layer storing data defining a second user profile of the user; and
   wherein, in addition to presenting the option for the user to select the first user profile to be used to customize the desktop or to request creation of the new user profile to be used to customize the desktop, the server also presents an option for the user to select the second user profile to be used to customize the desktop.

10. The method of claim 1, wherein the server stores a plurality of user data layers, each user data layer storing data defining a user profile for a particular user, and wherein the server also stores a data structure that identifies to which user each user data layer pertains.

11. A method, implemented by a server in a virtualization environment, for providing multiple user profiles to a single user, the method comprising:
    storing, on the server, a plurality of user data layers for a user, each user data layer storing data defining a different user profile of the user such that the server stores multiple data layers defining multiple user profiles for the same single user;

in response to the user attempting to log in to a desktop from a client device, presenting, on the client device from which the user is attempting to log in to the desktop, an option for user to select any of the different user profiles of the user to be used to customize the desktop; and in response to the user selecting one of the different user profiles, mounting the corresponding user data layer to customize the desktop in accordance with the selected user profile and providing, to the client device, the desktop that has been customized in accordance with the selected user profile.

12. The method of claim 11, further comprising:

in conjunction with presenting the option for the user to select any of the different user profiles of the user, presenting an option for the user to create a new user profile.

13. The method of claim 11, further comprising:

in response to the user selecting the option to create a new user profile, creating a new user data layer as a copy of one of the plurality of user data layers; and mounting the new user data layer to customize the desktop in accordance with the new user profile.

14. The method of claim 13, wherein the user data layer that is copied is a user data layer that stores data defining a default user profile.

15. The method of claim 13, wherein the new user data layer identifies a plurality of applications that are to be available when the new user profile is selected.

16. The method of claim 15, wherein the plurality of applications are stored on a plurality of application layers, the method further comprising:

mounting the plurality of application layers.

17. The method of claim 15, further comprising:

receiving user input that indicates that one or more of the plurality of applications should not be available when the new user profile is selected; and updating the new user data layer to remove the identification of the one or more applications that should not be available such that, when the new user profile is subsequently selected, one or more applications layers that include the one or more applications will not be mounted.

18. A layering system comprising one or more processors and computer storage media which are configured to implement the following:

a server that stores one or more operating system layers that each include an operating system, a plurality of application layers that each include one or more applications, and a plurality of user data layers that each define a user profile for a particular user, the server also storing information defining to which user each user data layer pertains;

wherein when a particular user attempts to log in to a desktop provided by the server using a client device, the server identifies each of multiple user data layers that pertain to the particular user and presents to the particular user an option for the particular user to select any of the user profiles defined by the identified multiple user data layers that pertain to the particular user; and wherein, in response to the particular user selecting one of the user profiles, the server mounts the user data layer that defines the selected user profile such that the desktop is customized in accordance with the selected user profile, the server is also providing, to the client device from which the particular user has attempted to log in, the desktop that has been customized in accordance with the selected user profile.

19. The layering system of claim 18, wherein each user data layer identifies one or more applications that are to be made available when the corresponding user profile is selected; and wherein, in conjunction with mounting the user data layer that defines the selected user profile, the server also mounts one or more application layers that include the one or more applications identified in the mounted user data layer.

20. The layering system of claim 18, further comprising:

layering filter drivers that cause data stored on the mounted user data layer and data stored on the one or more mounted application layers to be presented to the user as if the data was stored on the same partition.

* * * * *